(12) United States Patent
Nguyen et al.

(10) Patent No.: US 10,211,734 B1
(45) Date of Patent: Feb. 19, 2019

(54) BIDIRECTIONAL DC-DC CONVERTER

(71) Applicant: Huang-Jen Chiu, New Taipei (TW)

(72) Inventors: Anh-Dung Nguyen, Binh Thuan (VN);
Huang-Jen Chiu, New Taipei (TW);
Yu-Chen Liu, Taipei (TW)

(73) Assignee: HUANG-JEN CHIU, New Taipei (TW)

( * ) Notice: Subject to any disclaimer, the term of this patent is extended or adjusted under 35 U.S.C. 154(b) by 0 days.

(21) Appl. No.: 16/037,181

(22) Filed: Jul. 17, 2018

(51) Int. Cl.
*H02M 3/158* (2006.01)

(52) U.S. Cl.
CPC ................. *H02M 3/1582* (2013.01)

(58) Field of Classification Search
CPC .............. H02M 3/1566; H02M 3/33584
USPC ............. 323/266, 282–285; 363/78, 124
See application file for complete search history.

(56) References Cited

U.S. PATENT DOCUMENTS

| | | | | |
|---|---|---|---|---|
| 6,271,651 B1 * | 8/2001 | Stratakos | ............ | H02M 3/158 323/282 |
| 6,879,503 B2 * | 4/2005 | Meynard | ............ | H02M 5/293 363/124 |
| 2001/0004205 A1 * | 6/2001 | Miller | ............ | H02J 7/1423 323/224 |
| 2009/0302685 A1 * | 12/2009 | Kramer | ............ | B60L 11/005 307/80 |
| 2010/0060252 A1 * | 3/2010 | Nishimura | ............ | H01M 10/441 323/282 |
| 2012/0126777 A1 * | 5/2012 | Motegi | ............ | H02M 3/1582 323/311 |
| 2014/0145504 A1 * | 5/2014 | Kayama | ............ | H02J 7/0055 307/23 |
| 2014/0145692 A1 * | 5/2014 | Miyamae | ............ | H02M 3/158 323/271 |

* cited by examiner

*Primary Examiner* — Gary Nash
(74) *Attorney, Agent, or Firm* — Li & Cai Intellectual Property (USA) Office

(57) ABSTRACT

A bidirectional converter with high voltage gain and low switch voltage stress is provided. The bidirectional converter has a first input-output terminal and a second input-output terminal, and includes first and second inductors, first and second high side switch modules, first and second low side switch modules, a first clamping capacitor, first and second capacitors, and a switching control circuit. The switching control circuit is configured to switch between three switching modes.

10 Claims, 19 Drawing Sheets

BIDIRECTIONAL DC-DC CONVERTER

BACKGROUND OF THE INVENTION

1. Field of the Invention

The present disclosure relates to a bidirectional DC-DC converter, and particularly to a bidirectional DC-DC converter having low switch voltage stress and high voltage gain.

2. Description of Related Art

The demand for renewable energies such as solar energy via photovoltaic (PV) has increased rapidly in recent years due to the exhaustion of fossil fuel energies and their environmental concerns. However, this kind of renewable energies cannot be directly operated as a power supply to the load due to the intermittent nature of these energy sources. Therefore, energy storage systems (ESSs) such as batteries and ultra-capacitors are used to store energy when there is an over-supply of power, these then serve as power supplies when the supply from the renewable energies is low.

The bidirectional converter is the best candidate for adopting the charging and discharging modes of the ESSs and avoiding the stability problem of the PV system. The bidirectional converter can be operated in the charging mode from the PV system to the ESSs and can also be controlled to discharge the energy from the ESSs to the DC-load. Low-voltage ESSs have been widely used in many applications, such as electric vehicles and the distribution systems. Therefore, the bidirectional converter needs to follow the type of low-voltage batteries used.

High voltage-gain bidirectional converter can be categorized into two main groups: isolated and non-isolated converters, as shown in FIG. 1. The advantages of isolated converters, such as dual-active-bridge (DAB) and resonant converters, include their isolation and the arrangement of the output by the transformer turns ratio depending on specific applications. Specially, the DAB converter has been employed in many applications because of its simple topology and high power density.

However, the ZVS range of this converter is narrow and employs a complicated control system to achieve the specification. Therefore, the efficiency of this type of converter is usually low, especially at the high-line light-load condition.

Meanwhile, the resonant converter is commonly used because of its ZVS achievement. However, the high resonant current on the primary side can lead to high conduction loss on the secondary side, which can then lead to overall low performance. Moreover, the reactive components in the isolated converter can also cause many problems (although they are employed to achieve the ZVS). The size of the transformer can lead to low power density. The losses of components and the complicated controller are important issues that require further research attention. Furthermore, the stability and the reliability of this isolated bidirectional DC-DC converter is another issue since the controller is very complicated and the output range is narrow; then, the energy transfer is a challenge during the over-supply power from the PV system to the ESSs.

The bidirectional buck-boost converter has been discussed in both low and medium applications. However, for some applications that require high voltage, this converter cannot operate well because of the limitation of the duty ratio. Given the limitation of the controller, the small error of the duty ratio can lead to high error of the output. Therefore, the output cannot be regulated accurately, causing further problems for the battery side. Moreover, the output power is restricted due to the limitation of the duty ratio. The voltage stress on the switches is also a big issue because these applications operate at a high input voltage. Many new topologies increase the voltage gain of the non-isolated converters. However, the limitation of the duty ratio still exists in very high voltage gain applications. Moreover, they also require high voltage stress components such as MOSFETs, capacitors since the input voltage is high. Therefore, the choice of these components and their losses are big issues that require further research attention. Current balancing must also be carefully considered because of the use of the interleaved inductors. This is a significant issue when the circuit operates at high frequency.

SUMMARY OF THE INVENTION

According to an embodiment of the present disclosure, there is provided a bidirectional converter having a first input-output terminal and a second input-output terminal, the bidirectional converter includes first and second inductors, first and second high side switch modules, first and second low side switch modules, a first clamping capacitor, first and second capacitors, and a switching control circuit. The first inductor is connected between the first input-output terminal and the second input-output terminal, the first high side switch module is connected in series between one end of the first inductor and the first input-output terminal, the second high side switch module is connected between the first high side switch module and the first input-output terminal, the first low side switch module is connected between the one end of the first conductor and a reference point of potential, the first clamping capacitor has one end connected between the first high side switch module and the second high side switch module and another end connected to another end of the first inductor, the second low side switch module is connected between the another end of the first inductor and a reference point of potential, the second inductor is connected between the first inductor and the second input-output terminal, the first capacitor is connected between the first input-output terminal and a reference point of potential, the second capacitor is connected between the second input-output terminal and a reference point of potential, and the switching control circuit performs switching control of the first and second high side switch modules and the first and second low side switch modules. The switching control circuit is configured to switch between switching modes, and the switching modes includes: a first mode for causing the first high side switch module and the second low side switch module to be turned off, and causing the second high side switch module and the first low side switch module to be turned on, so that the first inductor is demagnetized and the second inductor is magnetized; a second mode for causing the first and second high side switch modules to be turned off, and causing the first and second low side switch modules to be turned on, so that the a voltage stress on the first inductor is zero and the second inductor is demagnetized; a third mode for causing the first high side switch module and the second low side switch module to be turned on, and causing the second high side switch module and the first low side switch module to be turned off, so that the first inductor is charged by the first clamping capacitor and the second inductor is demagnetized.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the disclosure are set forth in the appended claims. The disclosure itself, however, as well as modes of use, further objectives and advantages thereof, will best be understood with reference to the following detailed description of exemplary embodiments of the present disclosure when read in conjunction with the accompanying drawings, wherein:

DETAILED DESCRIPTION OF THE PREFERRED EMBODIMENTS

The detailed description set forth below is intended as a description of exemplary designs of the present disclosure and is not intended to represent the only designs in which the present disclosure can be practiced. The term "exemplary" is used herein to mean "serving as an example, instance, or illustration." Any design described herein as "exemplary" is not necessarily to be construed as preferred or advantageous over other designs. The detailed description includes specific details for the purpose of providing a thorough understanding of the exemplary designs of the present disclosure. It will be apparent to those skilled in the art that the exemplary designs described herein may be practiced without these specific details. In some instances, well-known structures and devices are shown in block diagram form in order to avoid obscuring the novelty of the exemplary designs presented herein.

Figure 1:
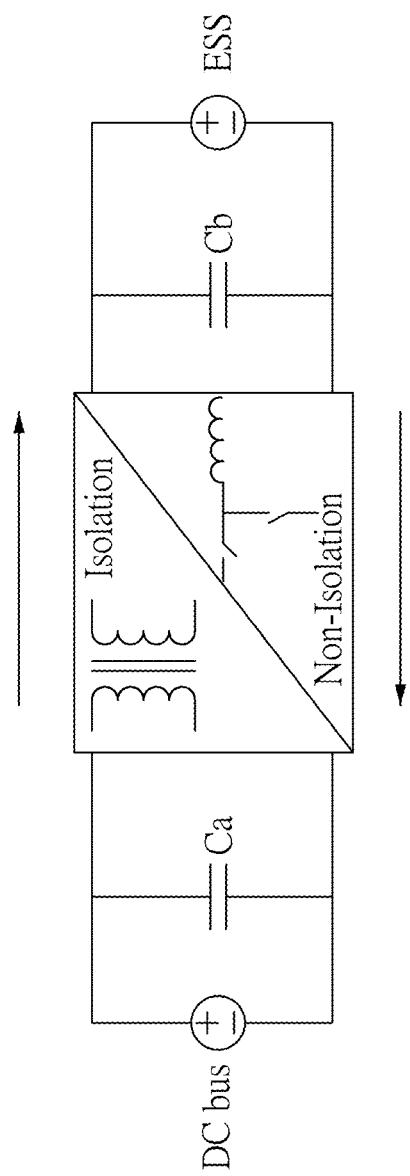
FIG. 1 shows a circuit layout of the existing high voltage-gain bidirectional converter.
Figure 2:
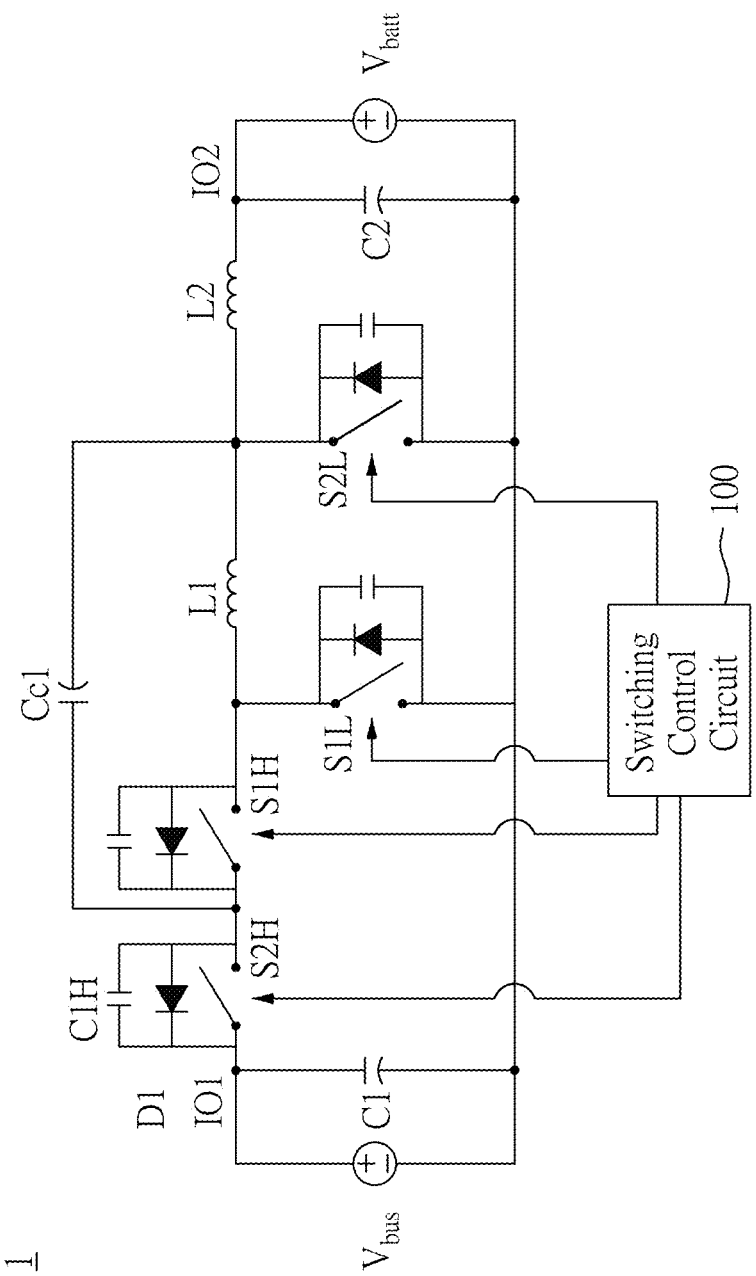
FIG. 2 shows a circuit layout of a bidirectional DC-DC converter in accordance with an exemplary embodiment of the present disclosure.

Referring more particularly to the drawings, embodiments of the disclosure may be described in the context of the bidirectional DC-DC converter as shown in FIG. 2.

As shown in FIG. 2, a circuit layout of a bidirectional DC-DC converter is depicted in accordance with an exemplary embodiment of the present disclosure. A bidirectional DC-DC converter 1 has a first input-output terminal IO1 connected to a DC bus having a DC-bus voltage $V_{bus}$ and a second input-output terminal IO2 connected to a battery having a battery voltage Vbatt, the bidirectional converter 1 includes a first inductor L1, a second inductor L2, a first high side switch module S1H, second high side switch module S2H, a first low side switch module S1L, a second low side switch module S2L, a first clamping capacitor Cc1, a first capacitor C1, a second capacitor C2, and a switching control circuit 100. Each of the first and second high side switch modules S1H and S2H, and the first and second low side switch modules S1L and S2L is connected in parallel with a diode and a resonance capacitor, for example, the second high side switch module S2H is connected in parallel with the diode D1 and the resonance capacitor C1H.

In detail, the first inductor L1 is connected between the first input-output terminal IO1 and the second input-output terminal IO2, the first high side switch module S1H is connected in series between one end of the first inductor L1 and the first input-output terminal IO1, the second high side switch module S2H is connected between the first high side switch module S1H and the first input-output terminal IO1, the first low side switch module S1L is connected between the one end of the first conductor C1 and a reference point of potential, i.e., a negative terminal of the DC bus, the first clamping capacitor Cc1 has one end connected between the first high side switch module S1H and the second high side switch module S2H and another end connected to another end of the first inductor L1.

Furthermore, the second low side switch module S2L is connected between the another end of the first inductor L1 and a reference point of potential, i.e., a negative terminal of the battery. The second inductor L2 is connected between the first inductor L1 and the second input-output terminal IO2, the first capacitor C1 is connected between the first input-output terminal IO1 and a reference point of potential and serve as an input capacitor, the second capacitor C2 is connected between the second input-output terminal IO2 and a reference point of potential and serve as an output capacitor, and the switching control circuit 100 may be configured to perform switching control of the first and second high side switch modules S1H and S2H and the first and second low side switch modules S1L and S2L.

The switching control circuit 100 controls switching operations of the first and second high side switch modules S1H and S2H, and the first and second low side switch modules S1L and S2L in a predetermined pattern. A microprocessor as a main control unit may be provided in the switching control circuit 100 to switch between modes for switch control.

Figure 3A:
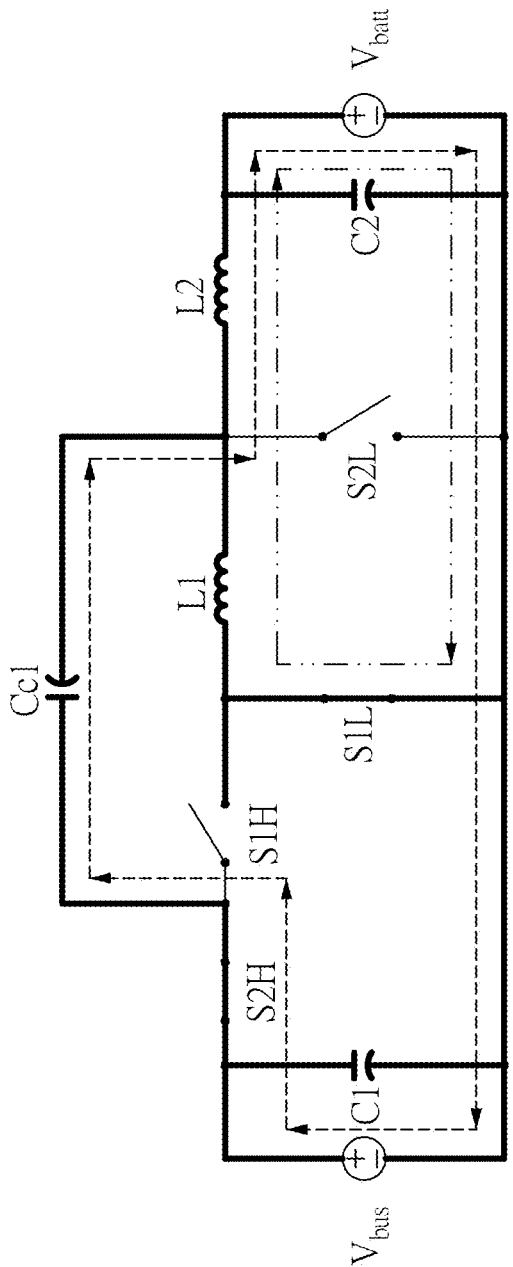
FIGS. 3A to 3C show operating schematical diagrams for first, second and third modes according to the bidirectional DC-DC converter of the present disclosure.
Figure 3B:
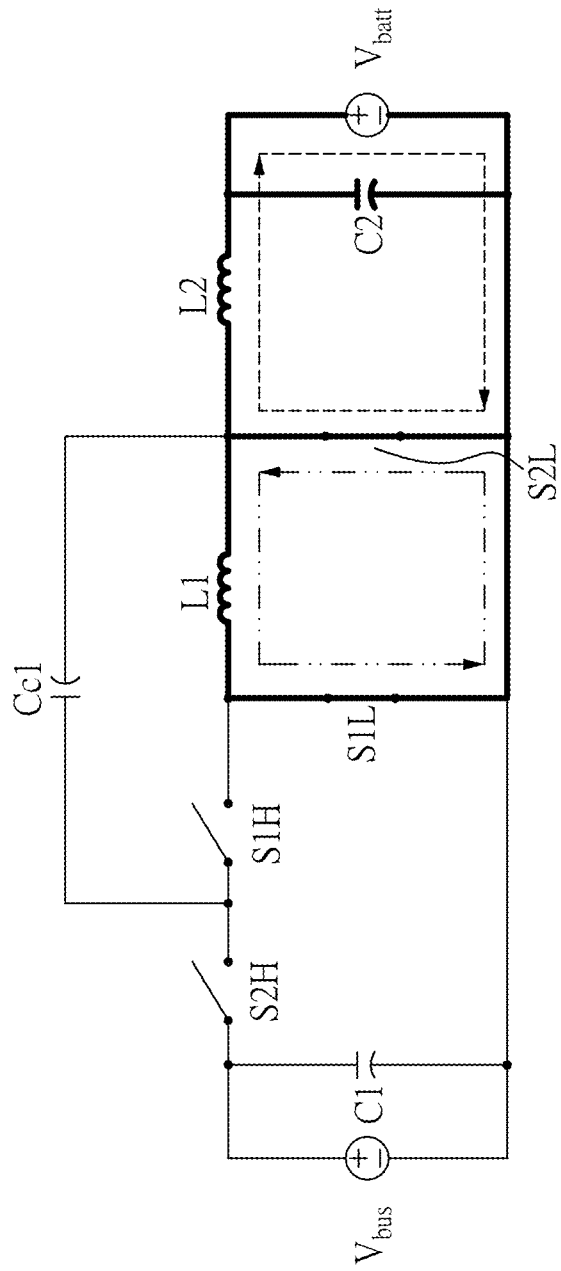
Figure 3C:
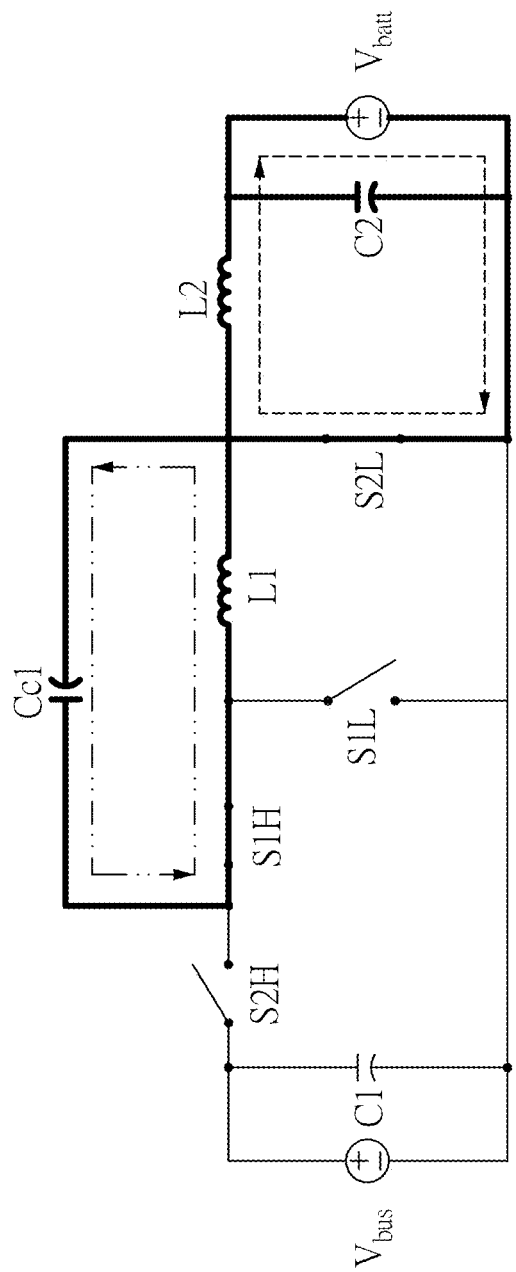
Figure 4:
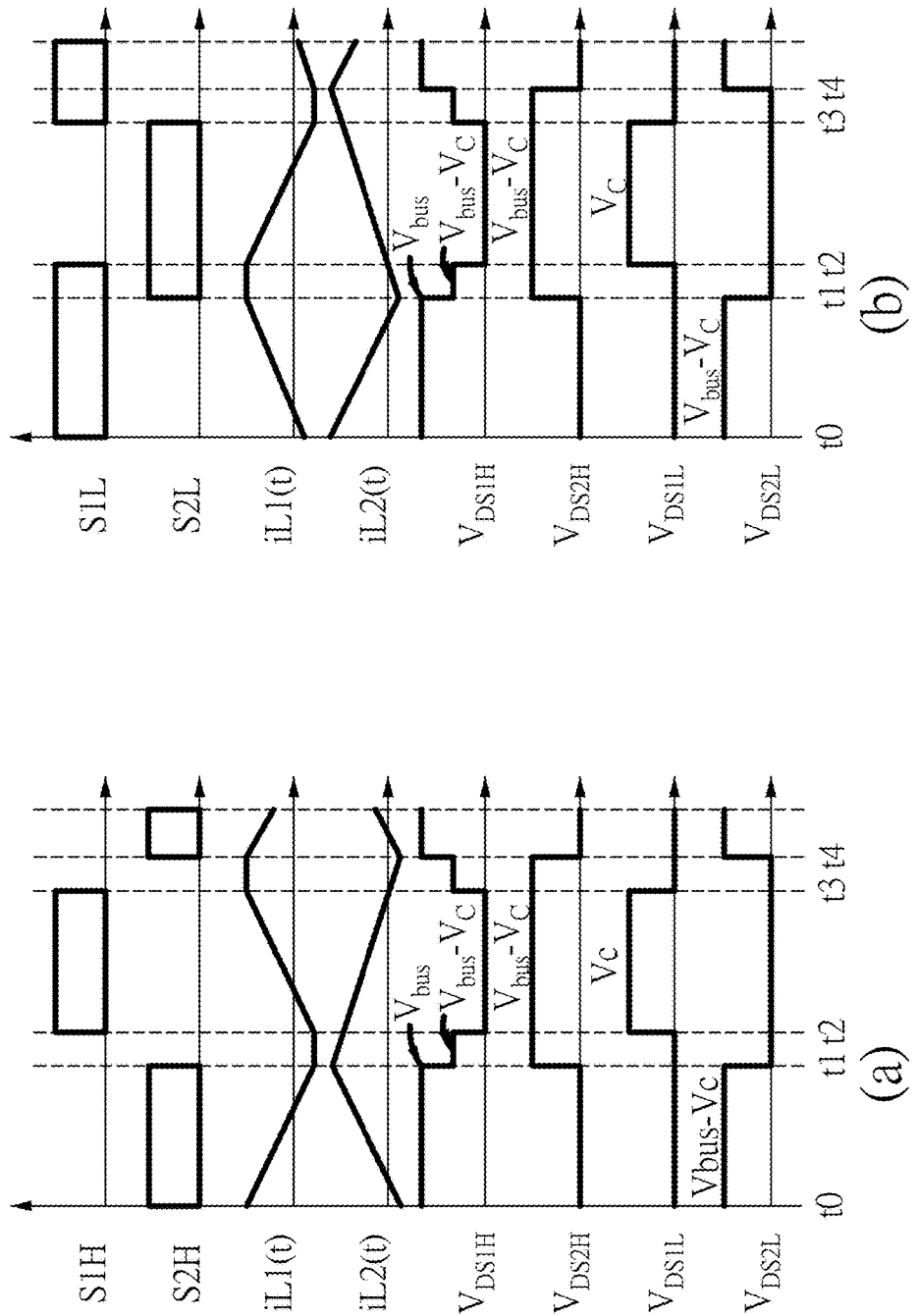
FIG. 4 shows timing diagrams for (a) buck and (b) boost mode according to the bidirectional DC-DC converter of the present disclosure.

Reference is now made to FIGS. 3A to 3C and FIG. 4. FIGS. 3A to 3C show operating schematical diagrams for first, second and third modes according to the bidirectional DC-DC converter of the present disclosure, and FIG. 4 shows timing diagrams for (a) buck and (b) boost mode according to the bidirectional DC-DC converter of the present disclosure.

The operating principles of the forward and reverse mode are similar and shown in FIGS. 3A to 3C and FIG. 4, so only the detail of the forward mode, i.e., buck mode, is discussed, and the reverse mode, i.e., boost mode, is omitted for conciseness. In this case, the first and second high side switch modules S1H and S2H, and the first and second low side switch module S1L and S2L are assumed to be ideal components, driving signals for respectively controlling the first and second high side switch modules S1H and S2H are shifted by 180 degree from each other, and the first and second low side switch module S1L and S2L are complementary switches of the first and second high side switch modules S1H and S2H, respectively. The duty ratio of the first and second high side switch modules S1H and S2H are assumed to be smaller than 0.5. Moreover, a capacitance of the first clamping capacitor Cc1 is equal to or larger than a capacitance value for providing a constant voltage of the first clamping capacitor Cc1. That is, the capacitance of the clamping capacitor Cc1 is assumed to be large enough to ensure the constant voltage of this capacitor.

The timing diagrams of the forward mode of the bidirectional DC-DC converter may be divided into four modes as shown in FIG. 4(a). The duty ratio of the first and second high side switch modules S1H and S2H is denoted as D, whereas the ON time of the complementary switches, i.e., the first and second low side switch module S1L and S2L, is $(1-D)T_S$, where $T_S$ is the switching period, and $f_S$ is the switching frequency.

First Mode [Time t0~t1]:

During this interval, the first and second high side switch modules S1H and S2H are turned ON and the first and second low side switch module S1L and S2L are turned OFF, as shown in FIG. 3A. The first inductor L1 is demagnetized by the voltage of $(V_C-V_{bus})$, and the second inductor L2 is magnetized by the voltage of $(V_{bus}-V_C-V_{batt})$. The battery voltage $V_{batt}$ is supplied from the first and second inductors L1 and L2. The relevant equations are expressed as following equations (1)~(3):

$$v_{L1} = L_1 \frac{di_{L1}}{dt} = V_C - V_{bus} \tag{1}$$

$$v_{L2} = L_2 \frac{di_{L2}}{dt} = V_{bus} - V_C - V_{batt} \tag{2}$$

$$i_C = C_C \frac{dV_C}{dt} = i_{L2} - i_{L1} \tag{3}$$

Second Mode [Time t1~t2]

The first and second high side switch modules S1H and S2H are turned OFF. Therefore, the first and second low side switch modules S1L and S2L are turned ON as shown in FIG. 3B. The voltage stress on the first inductor L1 is zero, and the current is then circulated. The second inductor L2 is demagnetized by the voltage of $(-V_{batt})$. Moreover, the voltage stress on the first and second high side switch modules S1H and S2H are $V_C$ and $(V_{bus}-V_C)$, respectively. The relevant equations are expressed as folling equations (4) and (5):

$$v_{L1} = L_1 \frac{di_{L1}}{dt} = 0 \tag{4}$$

$$v_{L2} = L_2 \frac{di_{L2}}{dt} = -V_{batt} \tag{5}$$

Third Mode [Time t2~t3]:

The first high side switch module S1H is turned ON, and the second high side switch module S2H is turned OFF, as shown in FIG. 3C. The first inductor L1 is charged by the first clamping capacitor Cc1, and the second inductor L2 remains demagnetized by the voltage of $(-V_{batt})$. The relevant equations are expressed as folling equations (6)~(8):

$$v_{L1} = L_1 \frac{di_{L1}}{dt} = V_C \tag{6}$$

$$v_{L2} = L_2 \frac{di_{L2}}{dt} = -V_{batt} \tag{7}$$

$$i_C = C_C \frac{dV_C}{dt} = -i_{L1} \tag{8}$$

Fourth Mode [Time t3~t4]:

This mode is the same as the second mode. The corresponding equations are shown in equations (4) and (5).

Furthermore, for analyzing the steady state of the bidirectional DC-DC converter, the volt-second-balance for the first and second inductors L1 and L2 can be expressed as following equation (9):

$$\begin{cases} v_{L1}|_{T_S} = DT_S(V_C - V_{bus}) + DT_S(V_C) = 0 \\ v_{L2}|_{T_S} = DT_S(V_{bus} - V_C - V_{batt}) + (T_S - DT_S)(-V_{batt}) = 0 \end{cases} \tag{9}$$

Through this calculation, a voltage of the first clamping capacitor and the voltage gain may be obtained in the following equation (10):

$$\begin{cases} V_C = \frac{V_{bus}}{2} \\ \frac{V_{batt}}{V_{bus}} = \frac{1}{2}D \end{cases} \tag{10}$$

Equation (10) shows that the clamping capacitor voltage is half of the input voltage and the voltage ratio is reduced twice. This indicates that with the same duty ratio D, voltage ratio can be controlled two times higher than the conventional buck converter. Meanwhile, FIG. 4 also shows that the voltage stress $V_{DS1H}$, $V_{DS2H}$, $V_{DS1L}$ and $V_{DS2L}$ on the first and second high side switch modules S1H and S2H, and the first and second low side switch modules S1L and S2L given by the following equations (11)~(14):

$$V_{DS1H} = \begin{cases} V_C & S_{1H} = 0, S_{2H} = 0 \\ V_{bus} & S_{1H} = 0, S_{2H} = 1 \\ 0 & S_{1H} = 1 \end{cases} \tag{11}$$

$$V_{DS2H} = \begin{cases} V_{bus} - V_C = \frac{V_{bus}}{2} & S_{2H} = 0 \\ 0 & S_{2H} = 1 \end{cases} \tag{12}$$

-continued $$V_{DS1L} = \begin{cases} V_C & S_{1L} = 0 \\ 0 & S_{1L} = 1 \end{cases} \quad (13)$$

$$V_{DS2L} = \begin{cases} V_{bus} - V_C & S_{2L} = 0 \\ 0 & S_{2L} = 1 \end{cases} \quad (14)$$

Figure 5:
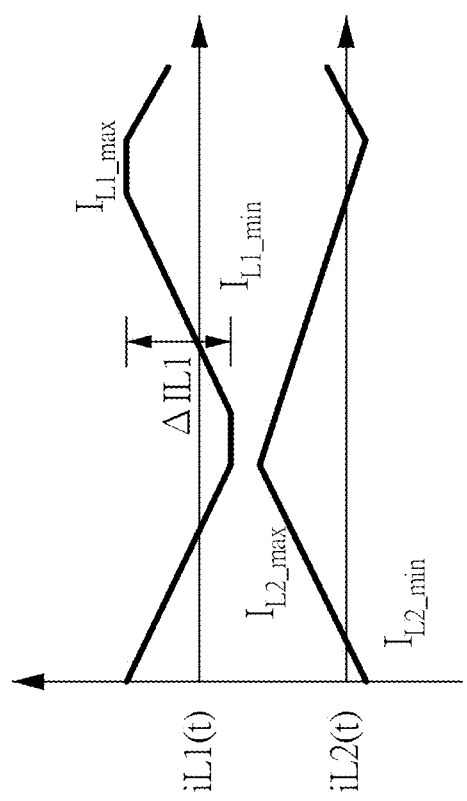
FIG. 5 shows inductor currents of the first and second inductors L1 and L2 of the bidirectional DC-DC converter in accordance with an exemplary embodiment of the present disclosure.

Reference is now made to FIG. 5, which shows inductor currents of the first and second inductors L1 and L2 of the bidirectional DC-DC converter in accordance with an exemplary embodiment of the present disclosure. From the timing diagram and the operating principle as shown in FIGS. 3A~3C and 4, respectively, the voltage stress on the second high side switch module S2H, and the first and second low side switch modules S1L and S2L are only half of the input voltage. It reduces the losses of the MOSFETs, which results in high efficiency. At the first high side switch module S1H, during the turn ON and OFF transition, the voltage stress on the MOSFETs is half of the input voltage, hence, the losses of this switch are also reduced.

From Equations (5) and (6), the peak-to-peak current can be expressed as the following equation (15):

$$\begin{cases} \Delta I_{L1} = \dfrac{V_C D T_S}{L_1} \\ \Delta I_{L2} = \dfrac{V_{batt}(1-D)T_S}{L_2} \end{cases} \quad (15)$$

Based on equations (3) and (8) and applying the ampere-second balance to the first clamping capacitor Cc1, the capacitor current in one period should be equal to zero. The corresponding equations are shown in equation (16):

$$i_C = C_C \dfrac{dV_C}{dt}\bigg|_{T_S} = DT_S(-I_{L1}) + DT(I_{L2} - I_{L1}) = 0 \quad (16)$$

The relationship between the currents of the first and second inductors L1 and L2 can be calculated by the following equation (17):

$$I_{L2} = I_{out} = 2I_{L1} \quad (17)$$

where $I_{out}$ is the output current. For any value of the first and second inductors L1 and L2, the average current $I_{L1}$ of the first inductor L1 is always two times smaller compared with that of the inductor current $I_{L2}$ of the second inductor L2. The minimum and maximum currents $I_{L1\_min}$, $I_{L1\_max}$, $I_{L2\_min}$ and $I_{L2\_max}$ of the currents of the first and second inductors L1 and L2 can be obtained by using the equation (18) below:

$$\begin{cases} I_{L1\_min} = \dfrac{I_{out} - \Delta I_{L1}}{2} \\ I_{L1\_max} = \dfrac{I_{out} + \Delta I_{L1}}{2} \\ I_{L2\_min} = I_{out} - \dfrac{\Delta I_{L2}}{2} \\ I_{L2\_max} = I_{out} + \dfrac{\Delta I_{L2}}{2} \end{cases} \quad (18)$$

Furthermore, the bidirectional DC-DC converter of the present disclosure may operate in the continuous conduction mode (CCM), discontinuous conduction mode (DCM), or triangular current mode (TCM), depending on the design of the inductors. Therefore, the inductances of the first and second inductors L1 and L2 may be specifically defined. The boundary condition the inductors operate on is expressed as following equation (19):

$$\begin{cases} 2I_{L1} \geq \Delta I_{L1},\ 2I_{L2} \geq \Delta I_{L2} \to CCM \\ 2I_{L1} \leq \Delta I_{L1},\ 2I_{L2} \leq \Delta I_{L2} \to DCM \end{cases} \quad (19)$$

From equation (15), the boundary condition for the first and second inductors may be given by the following equation (20):

$$\begin{cases} I_{out} \geq \Delta I_{L1},\ 2I_{out} \geq \Delta I_{L2} \to CCM \\ I_{out} \leq \Delta I_{L1},\ 2I_{out} \leq \Delta I_{L2} \to DCM \end{cases} \quad (20)$$

In this case, the first and second Inductors L1 and L2 can be designed independently for operating at CCM or TCM based on equations (15) and (20), where $L_{1\_cri}$ and $L_{2\_cri}$ are the inductance values at the boundary of CCM and TCM:

$$\begin{cases} L_{1\_cri} = \dfrac{V_C D T_S}{I_{out}} \\ L_{2\_cri} = \dfrac{V_{batt}(1-D)T_S}{2I_{out}} \end{cases} \quad (21)$$

$$\begin{cases} L_1 \geq L_{1\_cri} \to CCM \\ L_2 \geq L_{2\_cri} \to CCM \end{cases} \quad (22)$$

If the inductance is higher than critical inductance ($L_{1\_cri}$ and $L_{2\_cri}$), the bidirectional DC-DC converter 1 may operate at CCM, otherwise, $i_{L1}$ and $i_{L2}$ enter TCM. If the first and second low side switch modules S1L and S2L are replaced by diodes, the bidirectional DC-DC converter 1 may operate at DCM as the conventional buck converter. From equation (21), the designs of first and second inductors L1 and L2 are independent. Hence, comparing with the converter design with the conventional interleaved converter or any topology, the balancing issue in now easier to be obtained.

Figure 6:
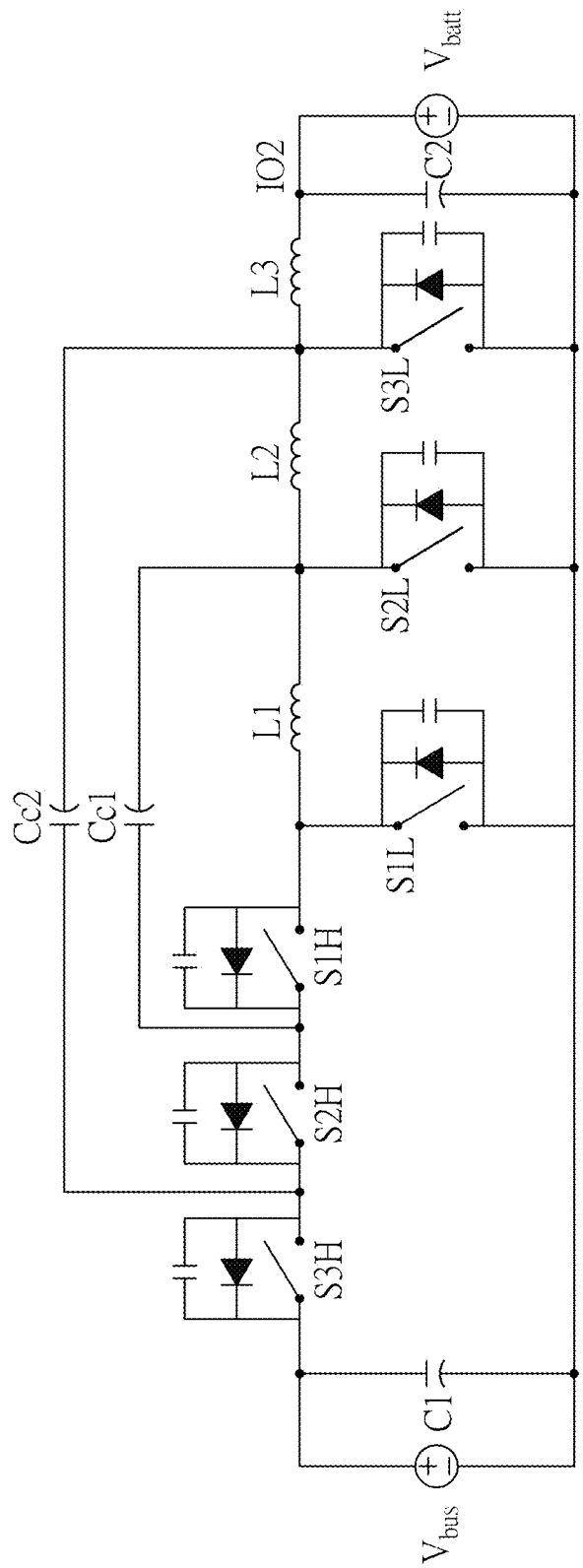
FIGS. 6 and 7 show circuit layouts of a bidirectional DC-DC converter in accordance with another exemplary embodiment of the present disclosure.
Figure 7:
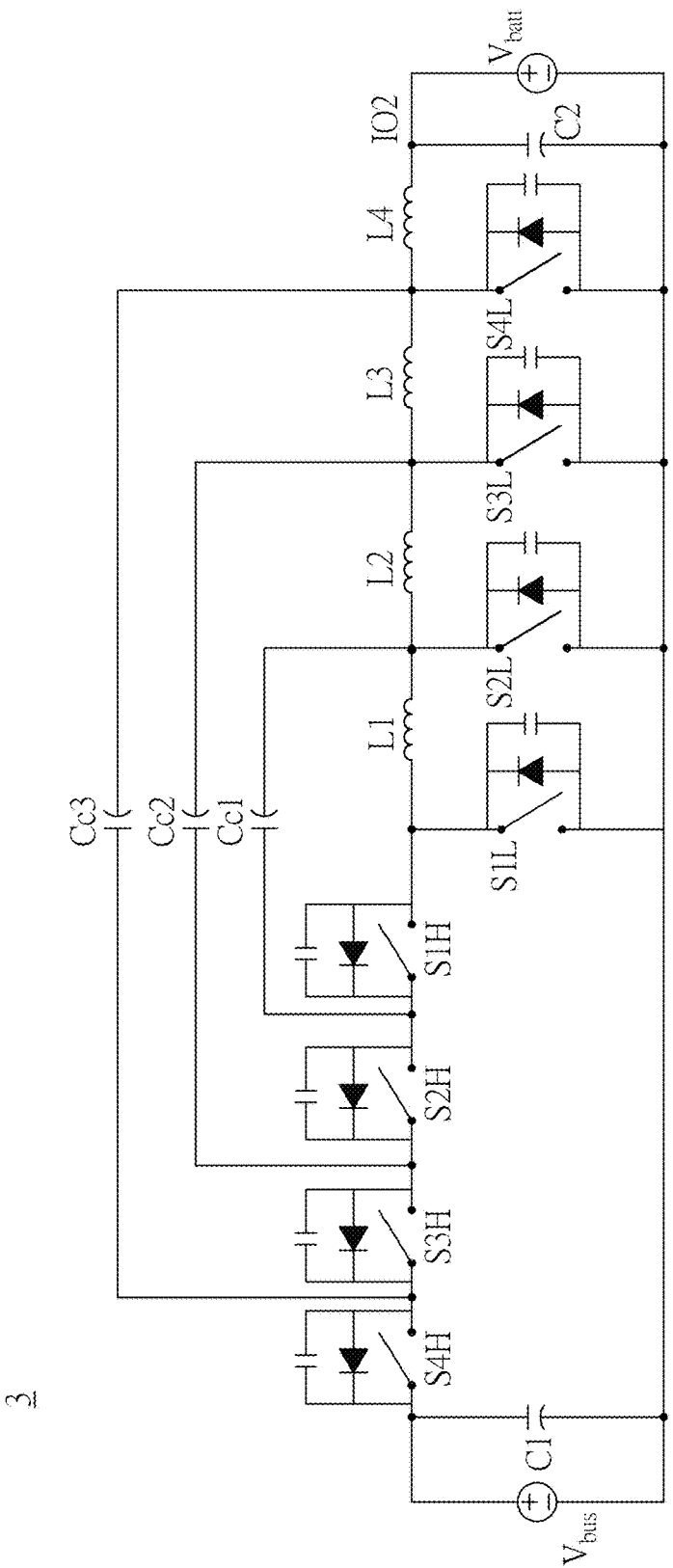

Reference is now made to FIGS. 6 and 7, which show circuit layouts of a bidirectional DC-DC converter in accordance with another exemplary embodiment of the present disclosure.

In the embodiment associated with FIG. 6, the bidirectional DC-DC converter 2 according to the present disclosure further includes a third high side switch module S3H, a third low side switch module S3L, a third inductor L3 and a second clamping capacitor Cc2. As shown in the FIG. 6, the third high side switch module S3H is connected between the first input-output terminal IO1 and the second high side switch module S2H, the third inductor L3 is connected between the second inductor L2 and the second input-output terminal IO2, the second clamping capacitor Cc2 having one end connected between the second and third high side switch modules S2H and S3H and another end connected between the second and third inductors L2 and L3, and the third low side switch module S3L is connected between the another end of the second clamping capacitor Cc2 and a reference point of potential.

In the embodiment associated with FIG. 7, the bidirectional DC-DC converter 3 according to the present disclosure further includes a fourth high side switch module S4H, a fourth low side switch module S4L, a fourth inductor L4 and a third clamping capacitor Cc3. As shown, the fourth high side switch module S4H is connected between the first input-output terminal IO1 and the third high side switch module S3H, the fourth inductor L4 is connected between the third inductor L3 and the second input-output terminal IO2, the third clamping capacitor Cc3 having one end connected between the third and fourth high side switch modules S3H and S4H and another end connected between the third and fourth inductors L3 and L4, and the fourth low side switch module S4L is connected between the another end of the third clamping capacitor Cc3 and a reference point of potential.

In this case, the derivate bidirectional DC-DC converters 2 and 3 of the present disclosure are shown in FIGS. 6 and 7. FIG. 6 shows the three-phase converter. The first, second and third high side switch modules S1H, S2H and S3H shift at 120° and 240° with the switches first, second and third low side switch modules S1L, S2L and S3L, as their complementary switches. The voltage stress on every switch is reduced to one-third of the input voltage, and voltage gain is three times higher than the conventional buck converter as expressed from the following equations (23)~(29).

$$V_{DSH,i} = S_{i+1,H}(V_{C,i+1} - V_{C,i-1}) + \bar{S}_{i+1,H}(V_{C,i}) \quad (23)$$

$$V_{DSH,n} = V_{bus} - V_{C,n-1} \quad (24)$$

$$V_{DSL,i} = V_{C,i} \quad (25)$$

$$V_{DSL,n} = V_{bus} - V_{C,n-1} \quad (26)$$

$$I_{L,i} = \frac{i}{n} I_{out} \quad (27)$$

$$V_{C,i} = \frac{i}{n} V_{bus} \quad (28)$$

$$\frac{V_{bus}}{V_{batt}} = \frac{D}{n} \quad (29)$$

Moreover, the power stored in every inductor is reduced from the third to first inductors L3 to L1. It must be noted that the design of every inductor is independent of power. With the four orders of the converter, as shown in FIG. 7 for the four phases, voltage stress on switches is reduced, and voltage gain is increased four times compared with the traditional converter. Therefore, the low on-resistance switches can be chosen for high voltage-gain application, results in the reduction of the conduction losses.

A 200 W prototype was built and tested to verify the bidirectional DC-DC converter of the present disclosure. The specification of this prototype is shown in the following Table 1:

TABLE 1

| Parameter | | Value | |
| --- | --- | --- | --- |
| DC-bus voltage | $V_{bus}$ | 400 Vdc | |
| Battery voltage | $V_{batt}$ | 48 Vdc | |
| Maximum power | $P_{max}$ | 200 W | |
| Switching frequency | $f_s$ | 100 kHz | |
| Clamping capacitor voltage ripple | $\Delta V_C$ | 1 Vdc | |
| Inductors | $L_1$ | L | 200 μH |
| | | $R_s$ | 40 mΩ |
| | $L_2$ | L | 100 μH |
| | | $R_s$ | 25 mΩ |

TABLE 1-continued

| Parameter | | Value | |
| --- | --- | --- | --- |
| MOSFET | IPI60R099CP | $R_{DS,\,ON}$ | 0.099 Ω |
| | | $C_{OSS}$ | 130 pF |
| Controller | TM5320F28035 | | |

The DC-bus $V_{bus}$ is 400 $V_{dc}$ and batteries $V_{batt}$ is 48 $V_{dc}$. From this specification, the duty ratio can be calculated as:

$$D = \frac{2V_{batt}}{V_{bus}} = 0.24$$

The inductors, such as the first and second inductors L1 and L2, are designed so that the bidirectional DC-DC converter may operate at CCM and TCM. This is done to demonstrate the advantage of the present disclosure. At the transition of 40% $P_{max}$, the output current can be defined as:

$$I_{out} = \frac{40\% P_{max}}{V_2} = 1.67 \text{ A}$$

From equation (21), the critical inductance can be calculated by:

$$\begin{cases} L_{1\_cri} = \frac{V_C D T_S}{I_{out}} = 287 \text{ μH} \\ L_{2\_cri} = \frac{V_{batt}(1-D)T_S}{2I_{out}} = 109 \text{ μH} \end{cases}$$

Inductances can be chosen to ensure that the converter can be operated at TCM with 40% load for the first and second inductors L1 and L2:

$$\begin{cases} L_1 = 200 \text{ μH} \\ L_2 = 100 \text{ μH} \end{cases}$$

Given the similar operation principle between the forward and reverse mode, the inductances of the first and second inductors L1 and L2 can be used in the reverse mode. With the inductances, the inductor current ripple can be calculated by:

$$\begin{cases} \Delta I_{L1} = \frac{V_C D T_S}{L_1} = 2.4 \text{ A} \\ \Delta I_{L2} = \frac{V_{batt}(1-D)T_S}{L_2} = 3.65 \text{ A} \end{cases}$$

The clamping capacitor should remain with a constant voltage of $V_{bus}/2$. Thus the capacitance should be large enough to reduce the voltage ripple, as shown in Table I. The clamping capacitor in the present embodiment is defined as:

$$C_C > \frac{i_C \Delta t}{\Delta V_C} = \frac{(I_{L2} - I_{L1})D T_S}{\Delta V_C} = 5 \text{ μF}$$

The clamping capacitance $C_C$=15 μF is chosen to ensure the constant voltage of the clamping capacitor given some parasitic component in the PCB and the equipment noise. The simulation of the bidirectional DC-DC converter of the present disclosure is carried out to modify the analysis and calculation. Inductances of the first and second inductors L1 and L2, and the clamping capacitance $C_C$ are chosen from above calculation. The voltage stresses on the MOSFETs of the forward and reverse mode are the same because of their similar operating principle with the reverse direction.

Figure 8A:
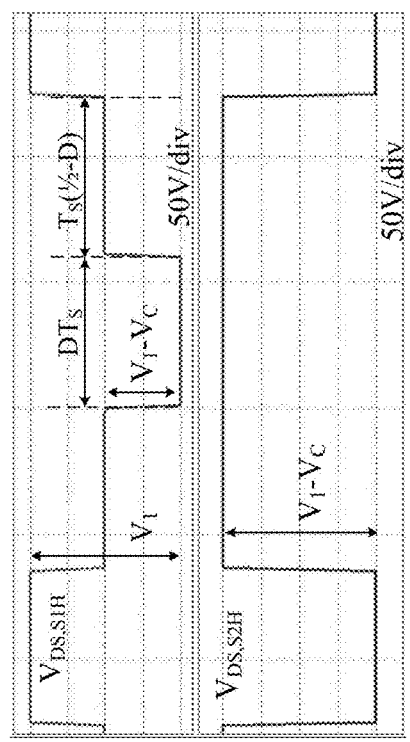
FIGS. 8(a) and 8(b) show results of the voltage stress on every switch module and the clamping capacitor voltage of the bidirectional DC-DC converter in accordance with an exemplary embodiment of the present disclosure.
Figure 8B:
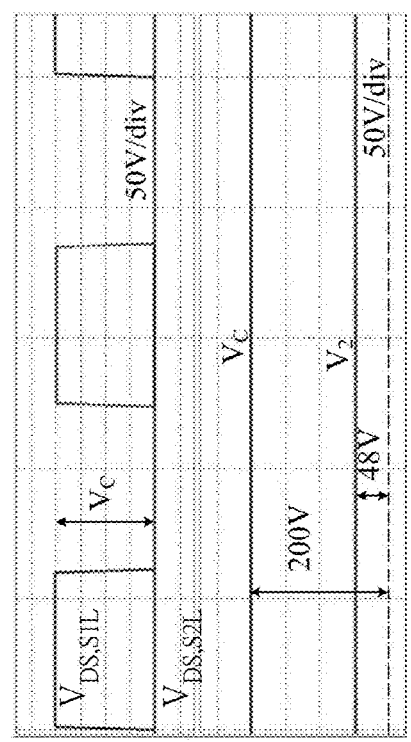

Reference is now made to FIGS. 8(a) and 8(b), FIGS. 8(a) and 8(b) show the results of the voltage stress on every switch module and the clamping capacitor voltage of the bidirectional DC-DC converter in accordance with an exemplary embodiment of the present disclosure. In the simulation waveforms of FIGS. 8(a) and 8(b), voltage stress $V_{DS,S1H}$ and $V_{DS,S2H}$ on the first and second high side switch modules S1H and S2H, voltage stress $V_{DS,S1L}$, $V_{DS,S2L}$, $V_C$ and $V_2$ on the first and second low side switch modules S1L, S2L, the clamping capacitor Cc1, and output voltage are shown. As can be seen, the maximum voltage stress on the first high side switch module S1H is the input voltage that is kept constant at $V_{bus}$ when the second high side switch module S2H is turned ON. The voltage stress on the first high side switch module S1H is equal to $(V_{bus}-V_C)$ when the second high side switch module S2H is turned OFF. Therefore, the switching losses of the first high side switch module S1H is reduced because of lower voltage stress at the transition. Moreover, the second high side switch module S2H is reduced ($V_C$) compared with the conventional step-down converter.

The voltage stress of the low-side switches is equal to the clamping capacitor voltage $V_C$ for the first low side switch module S1L and equal to $(V_{bus}-V_C)$ for the second low side switch module S2L. Therefore, this voltage stress is always lower than that of the traditional converter, and the voltage stress is equal to the input voltage. In the n order converter, the voltage stress is reduced, as shown in equations (23)~(26). Thus, voltage stress on the switch modules would not be a severe issue while comparing with the traditional step-down converter, especially at high-voltage applications.

Reference is now made to FIGS. 9(a) to 9(f), which show waveforms of the inductor currents $I_{L1}$ and $I_{L2}$ of the forward and reverse modes at 20%, 50%, and 100% loads of the bidirectional DC-DC converter in accordance with an exemplary embodiment of the present disclosure.

Figure 9A:
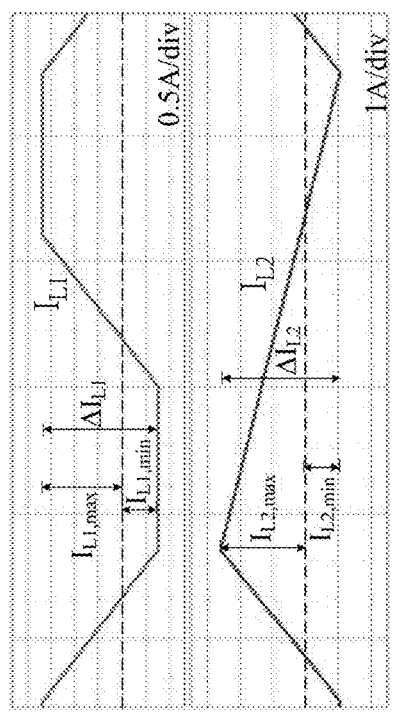
FIGS. 9(a) to 9(f) show the inductor current waveforms of the forward and reverse modes at 20%, 50%, and 100% loads of the bidirectional DC-DC converter in accordance with an exemplary embodiment of the present disclosure.
Figure 9B:
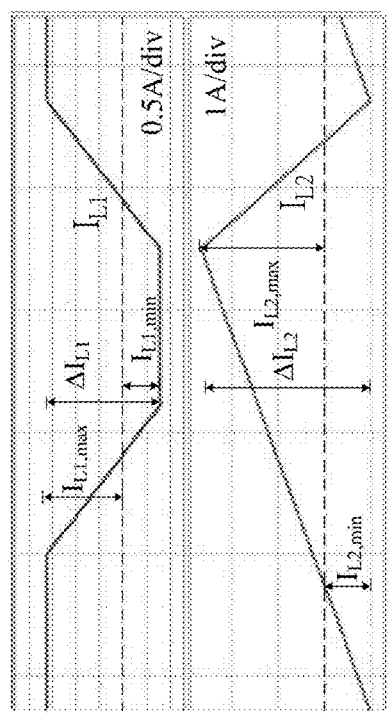
Figure 9C:
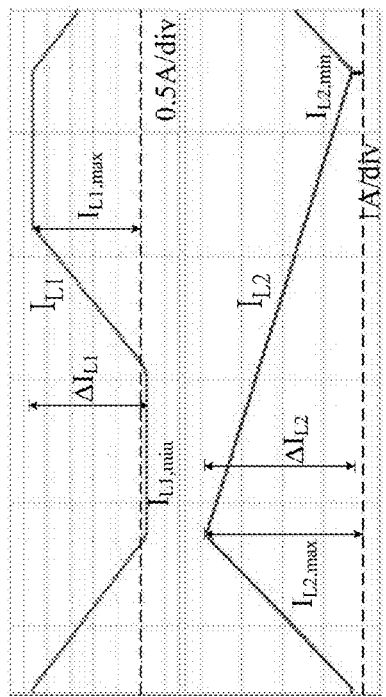
Figure 9D:
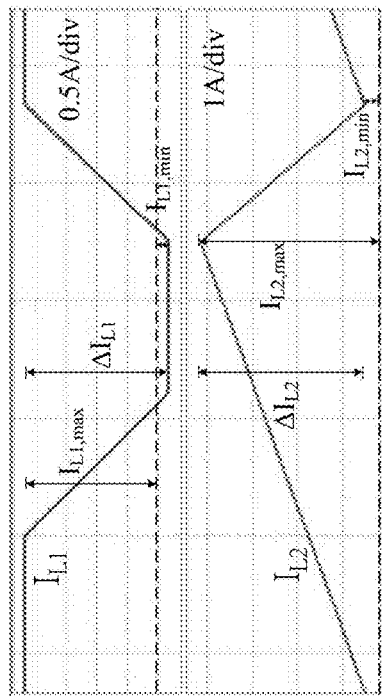
Figure 9E:
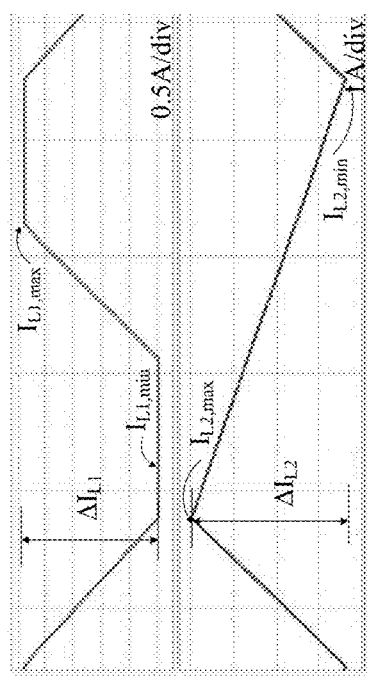
Figure 9F:
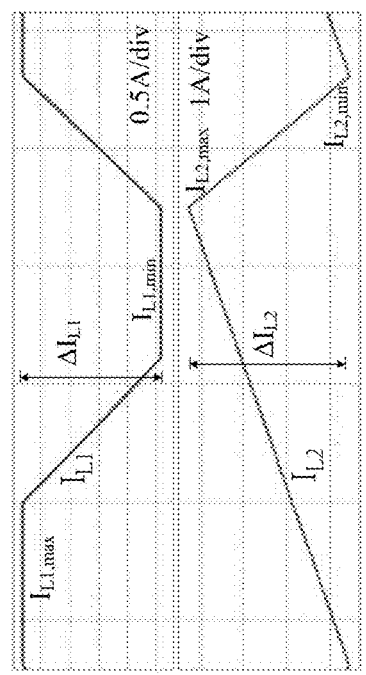

From the design of the inductors, if the load is lower than 40% of the maximum power, the converter is operated at TCM, as shown in FIGS. 9(a) and (b) for 20% load. However, if the load is higher than 40% of the maximum power, the converter is operated at CCM. Given that the average current of the first inductor L1 is half of the second inductor L2, the boundary condition of the two inductors is not the same.

Figure 10A:
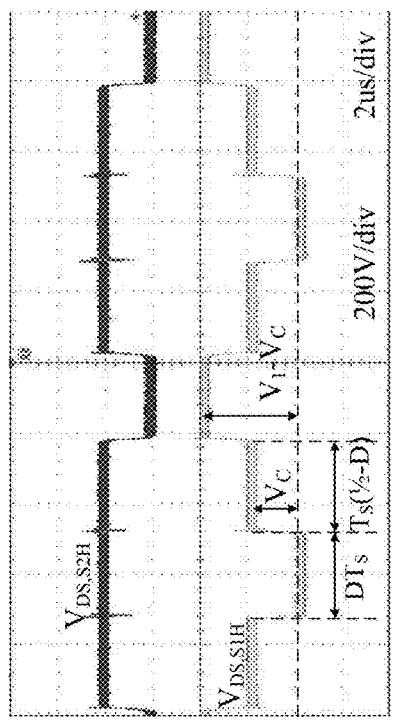
FIGS. 10(a) and 10(b) shows waveforms of (a) $V_{DS,S1H}$ and $V_{DS,S2H}$ and (b) $V_{DS,S1L}$ and $V_{DS,S2L}$ of the bidirectional DC-DC converter in accordance with an exemplary embodiment of the present disclosure.
Figure 10B:
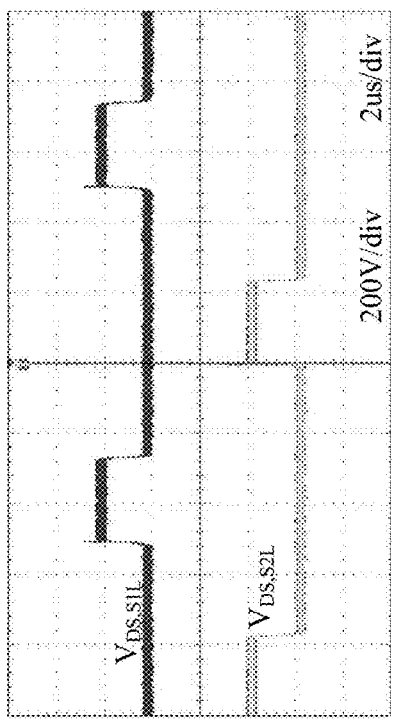

The 200 W prototype was built and tested to verify the analysis and simulation, as shown in FIGS. 10(a) and 10(b). FIGS. 10(a) and 10(b) show waveforms of voltage stress (a) $V_{DS,S1H}$ and $V_{DS,S2H}$ and (b) $V_{DS,S1L}$ and $V_{DS,S2L}$ of the bidirectional DC-DC converter in accordance with an exemplary embodiment of the present disclosure.

Figure 11A:
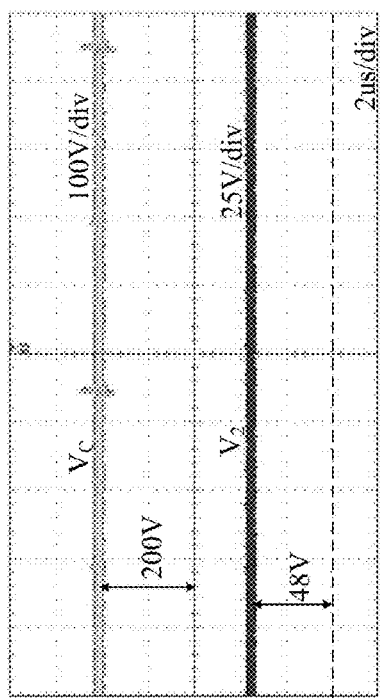
FIGS. 11(a) and 11(b) show waveforms of (a) battery voltage Vbatt and clamping capacitor voltage $V_C$ in forward flow and (b) DC-bus voltage $V_{bus}$ and clamping capacitor voltage $V_C$ in reverse flow in accordance with an exemplary embodiment of the present disclosure.
Figure 11B:
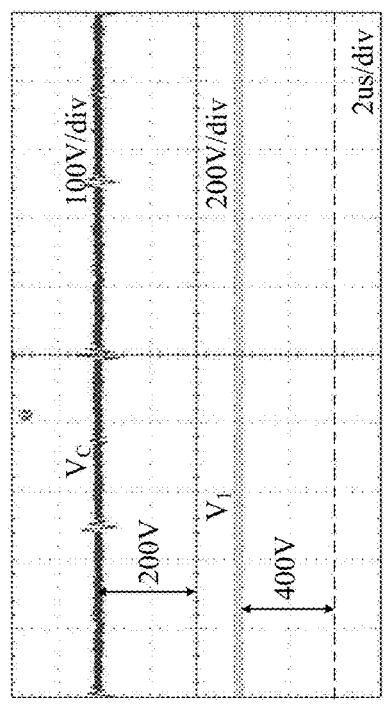

As shown, FIG. 10(a) shows that the voltage stress on the second high side switch module S2H is the clamping capacitor voltage $V_C$. The voltage stress $V_{DS,S1H}$ on the first high side switch module S1H is divided into two regions, $V_{bus}$ and $(V_{bus}-V_C)$, which match the analysis and simulation. FIG. 10(b) shows the voltage stress on the low side switch modules. The respective voltage stresses can be verified by equations (11)~(14). Furthermore, reference is now made to FIGS. 11(a) and 11(b), which shows waveforms of (a) battery voltage $V_{batt}$ and clamping capacitor voltage $V_C$ in forward flow and (b) DC-bus voltage $V_{bus}$ and clamping capacitor voltage $V_C$ in reverse flow in accordance with an exemplary embodiment of the present disclosure. The clamping capacitor voltage $V_C$ and the battery voltage Vbatt are shown in FIG. 11(a). $V_C$ is equal to half of the DC-bus voltage and is kept constant. Meanwhile, the battery voltage Vbatt is constant, and the ripple is as small as the conventional buck converter. In the reverse mode, the clamping capacitor is also kept at half of the DC-bus $V_{bus}$. The DC-bus voltage $V_{bus}$ is constant and can be regulated at 400 V.

Reference is now made to FIGS. 12(a) to 12(f), which shows waveforms of inductor currents $I_{L1}$ and $I_{L2}$ of (a), (c), (e) forward and (b), (d), (f) reverse modes at 20%, 50%, and 100% loads in the bidirectional DC-DC converter in accordance with an exemplary embodiment of the present disclosure.

Figure 12A:
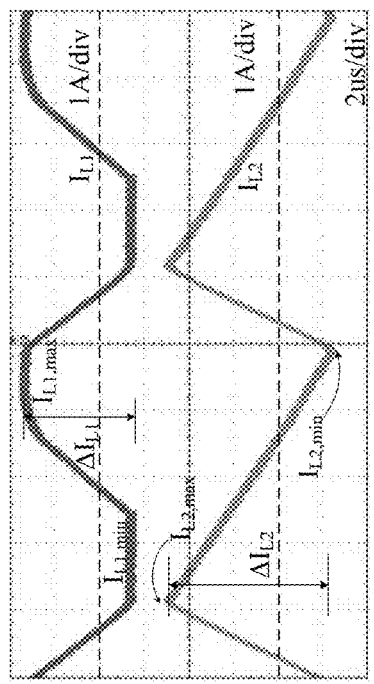
FIGS. 12(a) to 12(f) shows inductor current waveforms of (a), (c), (e) forward and (b), (d), (f) reverse modes at 20%, 50%, and 100% loads in the bidirectional DC-DC converter in accordance with an exemplary embodiment of the present disclosure.
Figure 12B:
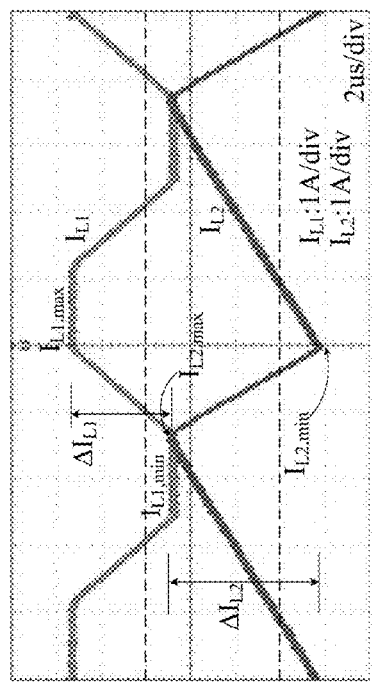
Figure 12C:
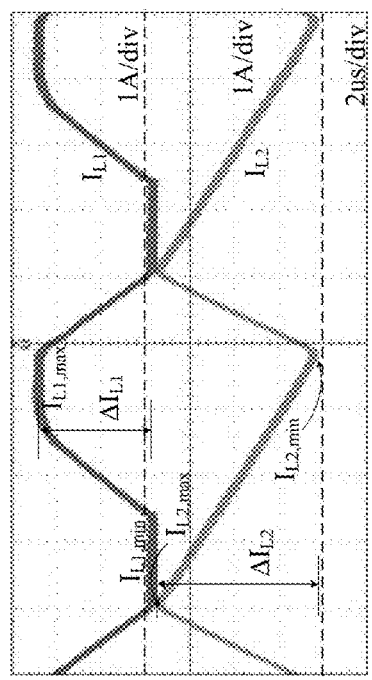
Figure 12D:
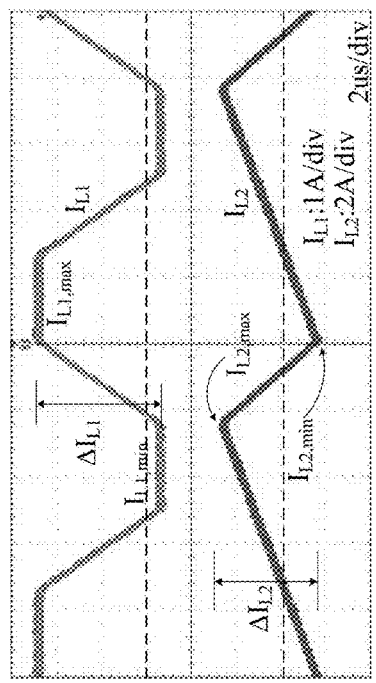
Figure 12E:
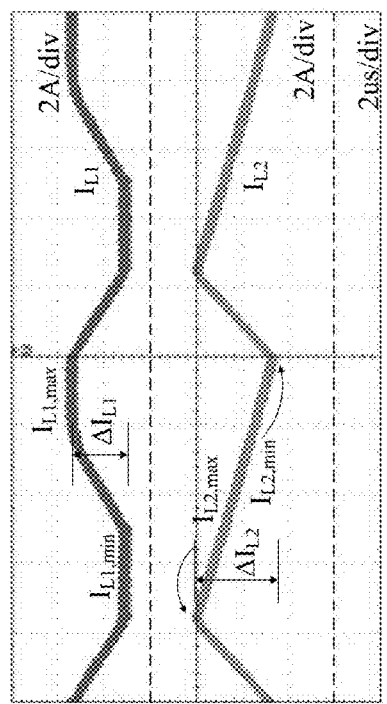
Figure 12F:
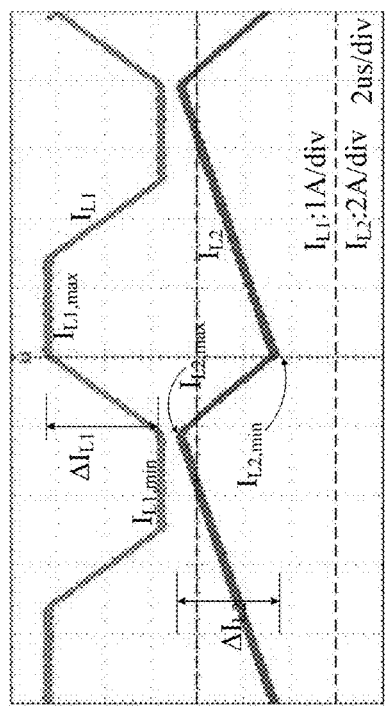
Figure 13:
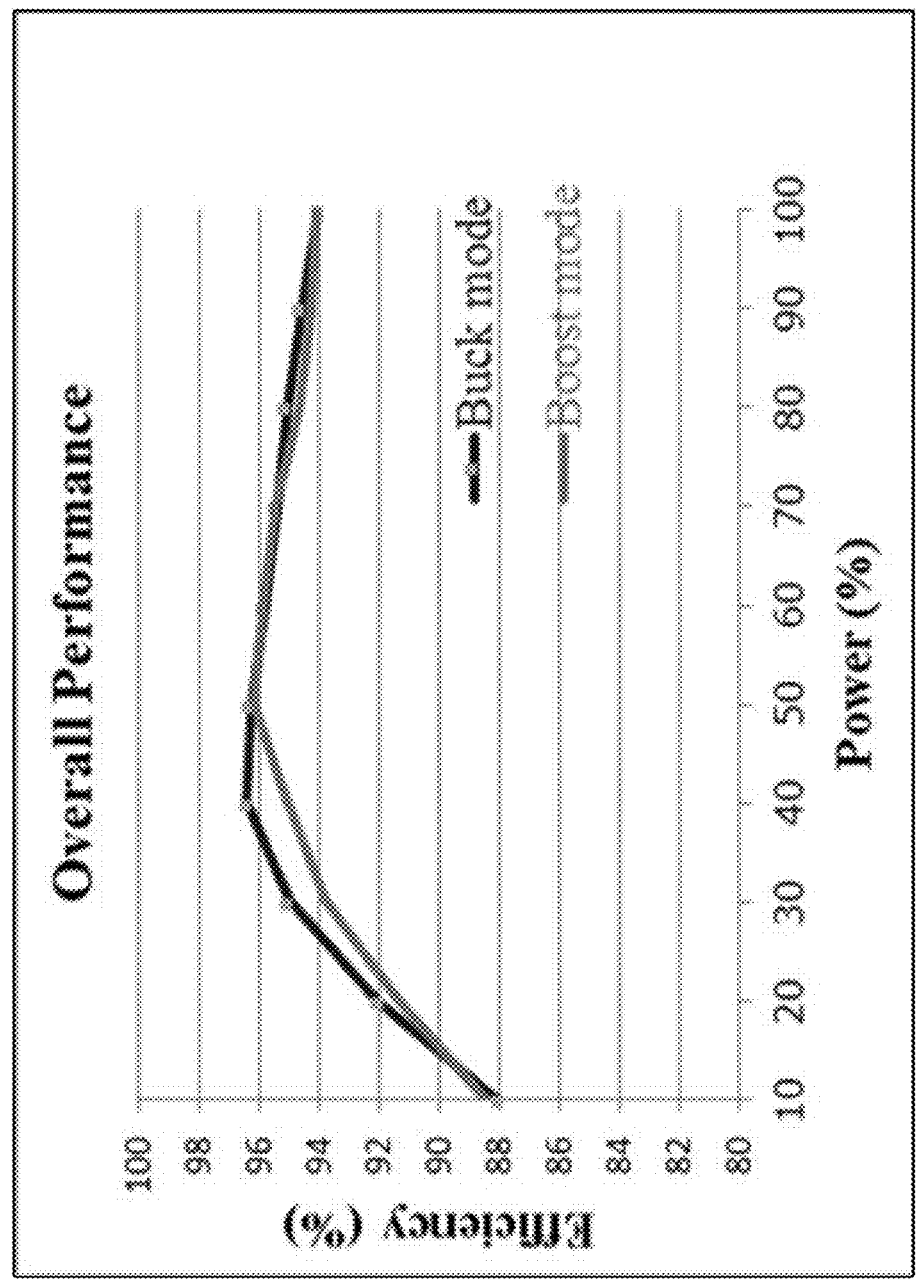
FIG. 13 shows the efficiency of the proposed converter in the forward and reverse flows in the bidirectional DC-DC converter in accordance with an exemplary embodiment of the present disclosure.

The waveforms of the inductor currents $I_{L1}$ and $I_{L2}$ are shown in FIGS. 12(a) to 12(f). In the forward mode, as shown in FIGS. 12(a), (c), and (e), the inductor current follows the analysis in equation (18). The inductor current is reversed in the reverse mode, as shown in FIGS. 12(b), (d), and (f). The characteristic of the inductor current does not change from the forward mode to the reverse mode, and the design of the inductors is the same for both power flows. The average inductor current $I_{L1}$ of the first inductor L1 is always equal to one second of the output current, whereas the average inductor current $I_{L2}$ of the second inductor L2 is the output current. Moreover, the changes that occurred in the two inductor currents are independent of each other and the output current affects the two inductor currents separately. Therefore, the design of two inductors are not similar to each other. FIG. 13 also shows the efficiency of the proposed converter in the forward and reverse flows in the bidirectional DC-DC converter in accordance with an exemplary embodiment of the present disclosure. The bidirectional DC-DC converter of the present disclosure is designed to operate from TCM to CCM to verify the similarity between this topology and the traditional step-down or step-up converter.

From above, the present disclosure provide a bidirectional DC-DC converter with the expandable high voltage gain. The voltage stress on every switch modules can be reduced significantly based on the number of order converters for the application. Therefore, the bidirectional DC-DC converter can be operated at a high voltage with a low voltage rating switch, resulting in a significant reduction of losses. Moreover, given the clamping capacitor and the sub-inductor, the voltage gain is increased with n times of n-order converters. The clamping capacitor voltage stress is also reduced, as demonstrated in the analysis above. The operating principle of the bidirectional DC-DC converter of the present disclosure is analyzed and is found to be similar to that of the conventional converter. Hence, the control techniques used in the conventional converters, such as TCM and CCM, can be employed in the proposed converter. Finally, the 200 W simulation and experiment were successfully built and tested to verify the feasibility of the proposed converter.

The description of the different exemplary embodiments has been presented for purposes of illustration and description, and is not intended to be exhaustive or limited to the disclosure in the form disclosed. Many modifications and variations will be apparent to those of ordinary skill in the art. Further, different exemplary embodiments may provide different advantages as compared to other exemplary embodiments. The embodiment or embodiments selected are chosen and described in order to best explain the principles of the disclosure, the practical application, and to enable others of ordinary skill in the art to understand the disclosure for various embodiments with various modifications as are suited to the particular use contemplated.

What is claimed is:

1. A bidirectional DC-DC converter having a first input-output terminal and a second input-output terminal, the bidirectional converter comprising:
   a first inductor connected between the first input-output terminal and the second input-output terminal;
   a first high side switch module connected in series between one end of the first inductor and the first input-output terminal;
   a second high side switch module connected between the first high side switch module and the first input-output terminal;
   a first low side switch module connected between the one end of the first inductor and a reference point of potential;
   a first clamping capacitor having one end connected between the first high side switch module and the second high side switch module and another end connected to another end of the first inductor;
   a second low side switch module connected between the another end of the first inductor and a reference point of potential;
   a second inductor connected between the first inductor and the second input-output terminal;
   a first capacitor connected between the first input-output terminal and a reference point of potential;
   a second capacitor connected between the second input-output terminal and a reference point of potential; and
   a switching control circuit to perform switching control of the first and second high side switch modules and the first and second low side switch modules,
   wherein the switching control circuit is configured to switch between switching modes, the switching modes comprising:
   a first mode for causing the first high side switch module and the second low side switch module to be turned off, and causing the second high side switch module and the first low side switch module to be turned on, so that the first inductor is demagnetized and the second inductor is magnetized;
   a second mode for causing the first and second high side switch modules to be turned off, and causing the first and second low side switch modules to be turned on, so that a voltage stress on the first inductor is zero and the second inductor is demagnetized;
   a third mode for causing the first high side switch module and the second low side switch module to be turned on, and causing the second high side switch module and the first low side switch module to be turned off, so that the first inductor is charged by the first clamping capacitor and the second inductor is demagnetized.

2. The bidirectional DC-DC converter according to claim 1, wherein the switching modes further includes a fourth mode configured to be the same as the second mode, and the first mode through the fourth mode are sequentially performed.

3. The bidirectional DC-DC converter according to claim 1, wherein driving signals for respectively controlling the first and second high side switch modules are shifted by 180 degree from each other.

4. The bidirectional DC-DC converter according to claim 1, wherein a duty ratio of the first and second high side switch modules are smaller than 0.5.

5. The bidirectional DC-DC converter according to claim 1, wherein a capacitance of the first clamping capacitor is equal to or larger than a capacitance value for providing a constant voltage of the first clamping capacitor.

6. The bidirectional DC-DC converter according to claim 1, wherein each of the first and second high side switch modules and the first and second low side switch modules is connected in parallel with a diode and a resonance capacitor.

7. The bidirectional DC-DC converter according to claim 1, wherein inductance values of the first inductor and the second inductor are equal to or larger than a first critical inductance and a second critical inductance, respectively.

8. The bidirectional DC-DC converter according to claim 1, wherein inductance values of the first inductor and the second inductor are smaller than a first critical inductance and a second critical inductance, respectively.

9. The bidirectional DC-DC converter according to claim 1, further including:
   a third high side switch module connected between the first input-output terminal and the second high side switch module;
   a third inductor connected between the second inductor and the second input-output terminal;
   a second clamping capacitor having one end connected between the second and third high side switch modules and another end connected between the second and third inductors; and
   a third low side switch module connected between the another end of the second clamping capacitor and a reference point of potential.

10. The bidirectional DC-DC converter according to claim 9, further including:
   a fourth high side switch module connected between the first input-output terminal and the third high side switch module;
   a fourth inductor connected between the third inductor and the second input-output terminal;
   a third clamping capacitor having one end connected between the third and fourth high side switch modules and another end connected between the third and fourth inductors;
   a fourth low side switch module connected between the another end of the third clamping capacitor and a reference point of potential.

* * * * *